(12) United States Patent
Wei et al.

(10) Patent No.: US 10,795,436 B2
(45) Date of Patent: *Oct. 6, 2020

(54) DETERMINING FIXATION OF A USER'S EYES FROM IMAGES OF PORTIONS OF THE USER'S FACE ENCLOSED BY A HEAD MOUNTED DISPLAY

(71) Applicant: Facebook Technologies, LLC, Menlo Park, CA (US)

(72) Inventors: Shih-En Wei, Pittsburgh, PA (US); Jason Saragih, Pittsburgh, PA (US); Hernan Badino, Pittsburgh, PA (US); Alexander Trenor Hypes, Pittsburgh, PA (US); Mohsen Shahmohammadi, Pittsburgh, PA (US); Dawei Wang, Pittsburgh, PA (US); Michal Perdoch, Pittsburgh, PA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/683,014

(22) Filed: Nov. 13, 2019

(65) Prior Publication Data

US 2020/0201430 A1 Jun. 25, 2020

Related U.S. Application Data

(63) Continuation of application No. 15/996,422, filed on Jun. 1, 2018, now Pat. No. 10,509,467.

(51) Int. Cl.
*G06F 3/01* (2006.01)
*H04N 13/344* (2018.01)
*G06N 5/04* (2006.01)

(52) U.S. Cl.
CPC .............. *G06F 3/013* (2013.01); *G06F 3/012* (2013.01); *G06N 5/046* (2013.01); *H04N 13/344* (2018.05)

(58) Field of Classification Search
CPC ....... G06F 3/012; G06F 3/013; H04N 13/344; G06N 5/046
See application file for complete search history.

(56) References Cited

U.S. PATENT DOCUMENTS 8,890,946 B2 * 11/2014 Publicover ........... H04N 5/2256
348/78
2015/0035744 A1 2/2015 Robbins et al.
(Continued)

*Primary Examiner* — Muhammad N Edun
(74) *Attorney, Agent, or Firm* — Fenwick & West LLP

(57) ABSTRACT

A virtual reality (VR) or augmented reality (AR) head mounted display (HMD) includes multiple image capture devices positioned within the HMD to capture portions of a face of a user wearing the HMD. Images from an image capture device include a user's eye, while additional images from another image capture device include the user's other eye. The images and the additional images are provided to a controller, which applies a trained model to the images and the additional images to generate a vector identifying a position of the user's head and positions of the user's eye and fixation of each of the user's eyes. Additionally, illumination sources illuminating portions of the user's face include in the images and in the additional images are configured when the user wears the HMD to prevent over-saturation or under-saturation of the images and the additional images.

17 Claims, 6 Drawing Sheets

(56) References Cited

U.S. PATENT DOCUMENTS

| | | |
|---|---|---|
| 2015/0160461 A1 | 6/2015 | Starner et al. |
| 2015/0326570 A1* | 11/2015 | Publicover ......... H04N 5/23229 726/4 |
| 2016/0140887 A1* | 5/2016 | Kim ....................... G09G 3/003 345/690 |
| 2019/0012528 A1 | 1/2019 | Wilson et al. |
| 2019/0132927 A1* | 5/2019 | De Bruijn ............... G06F 3/012 |
| 2019/0236355 A1* | 8/2019 | Ollila ................... G06K 9/2036 |

* cited by examiner

DETERMINING FIXATION OF A USER'S EYES FROM IMAGES OF PORTIONS OF THE USER'S FACE ENCLOSED BY A HEAD MOUNTED DISPLAY

CROSS REFERENCE TO RELATED APPLICATIONS

This application is a continuation of co-pending U.S. application Ser. No. 15/996,422, filed Jun. 1, 2018, which is incorporated by reference in its entirety.

BACKGROUND

The present disclosure generally relates to head mounted displays, and more specifically relates to determining a gaze of a user wearing a head mounted display.

Virtual reality systems typically include a display presenting content to users. For example, many virtual reality, or augmented reality, systems include a head-mounted display including a display element presenting image or video data to a user. Content presented by the virtual reality system depicts objects and users of the system.

Many virtual reality systems present graphical representations, or avatars, of users in a virtual environment to facilitate interactions between users. However, conventional virtual reality systems provide limited graphical representations of a user. For example, avatars representing users in many conventional virtual reality systems have a single facial expression, such as a default smiling or neutral facial expression, or a limited set of facial expressions. These limited facial expressions shown by avatars in virtual reality systems often present users from having a fully immersive experience in a virtual environment.

Tracking a user's face while the user interacts with a virtual reality system or an augmented reality system may provide a more immersive interface by allowing content presented by the virtual reality system or augmented reality system to replicate movement of the user's face, providing a more immersive experience for the user. However, conventional facial tracking systems typically include a dedicated peripheral, such as a camera, as well as markers positioned on the face and body of a user being tracked. Using markers and the additional peripheral may separate users from a provided virtual environment and are ill-suited for use in a portable, lightweight, and high-performance virtual reality headset.

Additionally, including an eye tracking system in a head mounted display used to present virtual reality or augmented reality content allows content presented by the head mounted display to provide more immersive content to a user wearing the head mounted display. For example, content provided to the user by the head mounted display is foveated, so portions of the content corresponding to a gaze direction of the user is presented with a higher resolution than other portions of the presented content. However, many conventional gaze tracking systems rely on high resolution images of a user's eyes, where a significant number of pixels in captured images include the eyes of the user. Including image capture devices dedicated to images of a user's eyes is often impractical for head mounted displays that include other devices capturing information about a face of a user wearing the head mounted display.

SUMMARY

A virtual reality (VR) or augmented reality (AR) head mounted display (HMD) includes multiple image capture devices having complementary fields of view and different depths. One or more of the image capture devices are positioned to capture images of a portion of a user's face external to a bottom side of the HMD. Additionally, one or more additional image capture devices are positioned to capture images of other portions of the user's face within the HMD. In various embodiments, a left image capture device is positioned within the HMD and proximate to a left side of the HMD and captures images of a portions of the user's face. A right image capture device is also positioned within the HMD and proximate to a right side of the HMD and captures portions of an additional portion of the user's face. Additionally, a central image capture device is positioned between exit pupils of the HMD that correspond to locations where the user's eyes are positioned and captures images of a central portion of the user's face. Hence, the left image capture device, the right image capture device, and the central image capture device each capture images of portions of the user's face that are enclosed by the HMD.

In various embodiments, images captured by the left image capture device include the user's left eye, and additional images captured by the right image capture device include the user's right eye. The left image capture device and the right image capture device are coupled to a controller that receives the images from the left image capture device and the additional images from the right image capture device. The controller applies a trained model to an image and to an additional image that generates a vector describing a position of the head of the user wearing the HMD. In various embodiments, the trained model is a trained convolutional neural network. Hence, the vector generated by the trained model identifies fixation of the user's left eye and the user's right eye relative to the position of the head of the user.

The trained model applied to the images and the additional images by the controller is trained based on data obtained from multiple users during a calibration process and provided to the controller. During the calibration process, the user wearing the HMD is presented with a calibration image via the HMD and instructed to direct the user's gaze to the calibration image. While continuing to direct the user's gaze to the calibration image, the user repositions the user's head when instructed by the HMD. The left image capture device captures images including the user's left eye when the user's head has different positions. Similarly, the right image capture device captures additional images including the user's right eye when the user's head has different positions. Based on the images and additional images captured when the user's head has different positions, gradient descent is applied to the images and additional images captured when the user's head has different positions to generate a vector representing fixation of the user's gaze relative to the position of the user's head from one or more images and one or more additional images captured when the user's head has the position. In various embodiments, the trained model is determined from multiple users wearing different HMDs and refined for the user wearing the HMD via the calibration process when the user wears the HMD. The controller may modify content presented by the HMD based on the vector generated by the trained model or may provide the vector to a console or another device that generates content for presentation via a based on the vector generated by the trained model.

Additionally, a left illumination source is positioned proximate to the left image capture device, and a right illumination source is positioned proximate to the right image capture device. For example, the left illumination source comprises one or more light emitting diodes (LEDs) positioned around a circumference of a lens of the left image capture device, while the right illumination source comprises one or more LEDs positioned around a circumference of a lends of the right image capture device. The left illumination source and the right illumination source emit light that illuminates the user's left eye and the user's right eye, respectively, and the left illumination source and the right illumination source are coupled to the controller. For example, the left illumination source and the right illumination source emit infrared light, and the left image capture device and the right image capture device capture infrared light reflected by the user's left eye and by the user's right eye, respectively.

To improve the images and the additional images captured by the left image capture device and by the right image capture device, respectively, the controller adjusts emission of light by the left illumination source and by the right illumination source. In various embodiments, the controller modifies light emission by the left illumination source based on images received from the left image capture device and modifies light emission by the right illumination source based on images received from the right image capture device. For example, the controller minimizes a function based on saturation or exposure by adjusting amounts of light emitted by different portions of the left illumination source or of the right illumination source. As an example, the controller modifies an amount of light emitted by different LEDs of the left illumination source (or of the right illumination source) based on minimization of the function. In some embodiments, the controller obtains information from a console or another source describing light emission by the left illumination source and the right illumination source determined by other controllers and modifies the obtained information during a training process when the user is wearing the HMD. This modification of the left illumination source and the right illumination source based on images captured by the left image capture device and additional images captured by the right image capture device, respectively, allows the controller to prevent oversaturation or undersaturation of the images and the additional images by tailoring light emission by the left illumination source or by the right illumination source to the user wearing the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
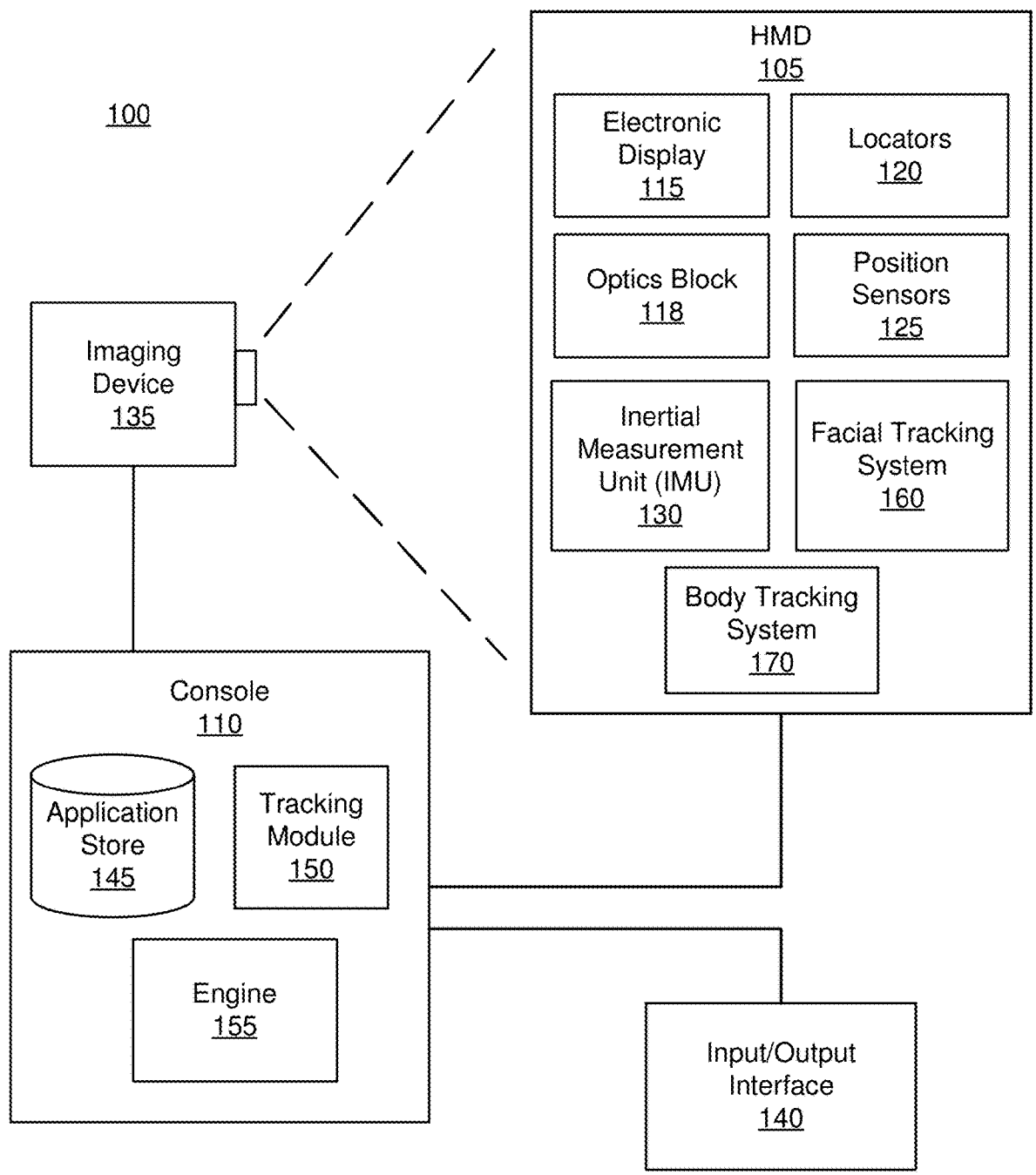
FIG. 1 is a block diagram of a virtual reality or an augmented reality system environment, in accordance with an embodiment.

FIG. 1 is a block diagram of a system environment 100 for providing virtual reality (VR) content or augmented reality (AR) content in accordance with an embodiment. The system environment 100 shown by FIG. 1 comprises a head mounted display (HMD) 105, an imaging device 135, and an input/output (I/O) interface 140 that are each coupled to a console 110. While FIG. 1 shows an example system environment 100 including one HMD 105, one imaging device 135, and one I/O interface 140, in other embodiments, any number of these components are included in the system environment 100. For example, an embodiment includes multiple HMDs 105 each having an associated I/O interface 140 and being monitored by one or more imaging devices 135, with each HMD 105, I/O interface 140, and imaging device 135 communicating with the console 110. In alternative configurations, different and/or additional components may be included in the system environment 100.

The HMD 105 presents content to a user. Examples of content presented by the HMD 105 include one or more images, video, audio, or some combination thereof. In some embodiments, audio is presented via an external device (e.g., speakers and/or headphones) that receives audio information from the HMD 105, the console 110, or both, and presents audio data based on the audio information. An embodiment of the HMD 105 is further described below in conjunction with FIGS. 3 and 4. In one example, the HMD 105 comprises one or more rigid bodies, which are rigidly or non-rigidly coupled to each other. A rigid coupling between rigid bodies causes the coupled rigid bodies to act as a single rigid entity. In contrast, a non-rigid coupling between rigid bodies allows the rigid bodies to move relative to each other.

The HMD 105 includes an electronic display 115, an optics block 118, one or more locators 120, one or more position sensors 125, an inertial measurement unit (IMU) 130, and a facial tracking system 160. The electronic display 115 displays images to the user in accordance with data received from the console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies received image light from the electronic display 115, corrects optical errors associated with the image light, and presents the corrected image light to a user of the HMD 105. In an embodiment, the optics block 118 includes one or more optical elements and/or combinations of different optical elements. For example, an optical element is an aperture, a Fresnel lens, a convex lens, a concave lens, a filter, or any other suitable optical element that affects the image light emitted from the electronic display 115. In some embodiments, one or more of the optical elements in the optics block 118 may have one or more coatings, such as anti-reflective coatings.

Magnification and focusing of the image light by the optics block 118 allows the electronic display 115 to be physically smaller, weigh less, and consume less power than larger displays. Additionally, magnification may increase a field of view of the displayed content. For example, the field of view of the displayed content is such that the displayed content is presented using almost all (e.g., 110 degrees diagonal), and in some cases all, of the user's field of view. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

In an embodiment, the optics block 118 is designed to correct one or more types of optical errors. Examples of optical errors include: two-dimensional optical errors, three-dimensional optical errors, or some combination thereof. Two-dimensional errors are optical aberrations that occur in two dimensions. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The HMD 105 may include various locators 120 in some embodiments. The locators 120 are objects located in specific positions on the HMD 105 relative to one another and relative to a specific reference point on the HMD 105. For example, a locator 120 is a light emitting diode (LED), a corner cube reflector, a reflective marker, a type of light source that contrasts with an environment in which the HMD 105 operates, or some combination thereof. In embodiments where the locators 120 are active (i.e., an LED or other type of light emitting device), the locators 120 may emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof.

In some embodiments, the locators 120 are located beneath an outer surface of the HMD 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the HMD 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the HMD 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the HMD 105 relative to an initial position of the HMD 105. For example, the position sensors 125 include multiple accelerometers to measure translational motion (forward/back, up/down, and left/right) and multiple gyroscopes to measure rotational motion (e.g., pitch, yaw, and roll). In some embodiments, the IMU 130 rapidly samples the measurement signals and calculates the estimated position of the HMD 105 from the sampled data. For example, the IMU 130 integrates the measurement signals received from the accelerometers over time to estimate a velocity vector and integrates the velocity vector over time to determine an estimated position of a reference point on the HMD 105. Alternatively, the IMU 130 provides the sampled measurement signals to the console 110, which determines the fast calibration data. The reference point is a point describing the position of the HMD 105. While the reference point may generally be defined as a point in space, in practice, the reference point is defined as a point within the HMD 105 (e.g., a center of the IMU 130).

The IMU 130 receives one or more calibration parameters from the console 110. As further discussed below, the one or more calibration parameters are used to maintain tracking of the HMD 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The facial tracking system 160 generates reconstructions of portions of a face of a user wearing the HMD 105, as further described below in conjunction with FIGS. 2-5. In an embodiment, the facial tracking system 160 includes image capture devices, additional image capture devices, and a controller, as further described below in conjunction with FIG. 2. The facial tracking system 160 includes any suitable number of image capture devices or additional image capture devices in various implementations. In some embodiments, the facial tracking system 160 also includes one or more illumination sources configured to illuminate portions of the user's face within fields of view of the one or more of the image capture devices or of the additional image capture devices. Based on images received from the image capture devices and from the additional image capture devices, the controller generates a trained model that maps positions of points identified within images captured by the image capture devices and by the additional image capture devices to a set of animation parameters that map the positions of the identified points to a three dimensional model of a face presented via a virtual reality environment of the HMD 105. Additionally, based on images of portions of the user's face enclosed by the HMD 105 that include the user's left eye and the user's right eye, the facial tracking system 160 determines a fixation of the user's left eye and a fixation of the user's right eye relative to an orientation of the user's head.

The body tracking system 170 generates reconstructions of portions of a body of the user wearing the HMD 105. In an embodiment, the body tracking system 170 includes imaging devices configured to capture images of portions of the user's body outside of the HMD 105. For example, each imaging device is a camera having a field of view sufficient to capture one or more portions of the user's body outside of the HMD 105. As an example, the body tracking system 170 comprises multiple video cameras positioned along a bottom surface of the HMD 105 that are each configured to capture images including one or more portions of the user's body (e.g., arms, legs, hands, etc.). In some embodiments, the body tracking system 170 also includes one or more illumination sources configured to illuminate portions of the user's body within fields of view of the one or more of the imaging devices. The imaging devices are coupled to the controller of the facial tracking system, which generates a trained model that maps positions of points identified within images captured by the imaging devices to a set of body animation parameters based on images received from the imaging devices. The body animation parameters map positions of points of the user's body identified from the images to a three dimensional model of a body presented via a virtual reality environment of the HMD 105.

The imaging device 135 generates slow calibration data in accordance with calibration parameters received from the console 110. Slow calibration data includes one or more images showing observed positions of the locators 120 that are detectable by the imaging device 135. In some embodiments, the imaging device 135 includes one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the console 110, and the imaging device 135 receives one or more calibration parameters from the console 110 to adjust one or more imaging parameters (e.g., focal length, focus, frame rate, ISO, sensor temperature, shutter speed, aperture, etc.).

The input/output (I/O) interface 140 is a device that allows a user to send action requests to the console 110 and to receive responses from the console 110. An action request is a request to perform a particular action. For example, an action request may be to start or end an application or to perform a particular action within the application. The I/O interface 140 may include one or more input devices. Example input devices include: a keyboard, a mouse, a game controller, or any other suitable device for receiving action requests and communicating the received action requests to the console 110. An action request received by the I/O interface 140 is communicated to the console 110, which performs an action corresponding to the action request. In some embodiments, the I/O interface 140 may provide haptic feedback to the user in accordance with instructions received from the console 110. For example, haptic feedback is provided when an action request is received or when the console 110 communicates instructions to the I/O interface 140 causing the I/O interface 140 to generate haptic feedback when the console 110 performs an action.

The console 110 provides content to the HMD 105 for presentation to a user in accordance with information received from one or more of: the imaging device 135, the HMD 105, and the I/O interface 140. In the example shown in FIG. 1, the console 110 includes an application store 145, a tracking module 150, and a virtual reality (VR) engine 155. Some embodiments of the console 110 have different modules than those described in conjunction with FIG. 1. Similarly, the functions further described below may be distributed among components of the console 110 in a different manner than is described here.

The application store 145 stores one or more applications for execution by the console 110. An application is a group of instructions, that when executed by a processor, generates content for presentation to the user. Content generated by an application may be in response to inputs received from the user via movement of the HMD 105 or the I/O interface 140. Examples of applications include: gaming applications, conferencing applications, video playback application, or other suitable applications.

The tracking module 150 calibrates the system environment 100 using one or more calibration parameters and may adjust one or more calibration parameters to reduce error in determination of the position of the HMD 105. For example, the tracking module 150 adjusts the focus of the imaging device 135 to obtain a more accurate position for observed locators 120 on the HMD 105. Moreover, calibration performed by the tracking module 150 also accounts for information received from the IMU 130. Additionally, if tracking of the HMD 105 is lost (e.g., the imaging device 135 loses line of sight of at least a threshold number of the locators 120), the tracking module 140 re-calibrates some of or the entire system environment 100, The tracking module 150 tracks movements of the HMD 105 using slow calibration information from the imaging device 135. The tracking module 150 determines positions of a reference point of the HMD 105 using observed locators 120 on the HMD 105 from the slow calibration information and a model of the HMD 105. The tracking module 150 also determines positions of a reference point of the HMD 105 using position information from the fast calibration information. Additionally, in some embodiments, the tracking module 150 uses portions of the fast calibration information, the slow calibration information, or some combination thereof, to predict a future location of the HMD 105. The tracking module 150 provides the estimated or predicted future position of the HMD 105 to the engine 155.

The engine 155 executes applications within the system environment 100 and receives position information, acceleration information, velocity information, predicted future positions, or some combination thereof of the HMD 105 from the tracking module 150. Based on the received information, the engine 155 determines content to provide to the HMD 105 for presentation to a user. For example, if the received information indicates that the user has looked to the left, the engine 155 generates content for the HMD 105 that mirrors the user's movement in a virtual environment. Additionally, the VR engine 155 performs an action within an application executing on the console 110 in response to an action request received from the I/O interface 140 and provides feedback to the user that the action was performed. For example, the provided feedback includes visual or audible feedback via the HMD 105 or haptic feedback via the I/O interface 140.

Facial Tracking System

Figure 2:
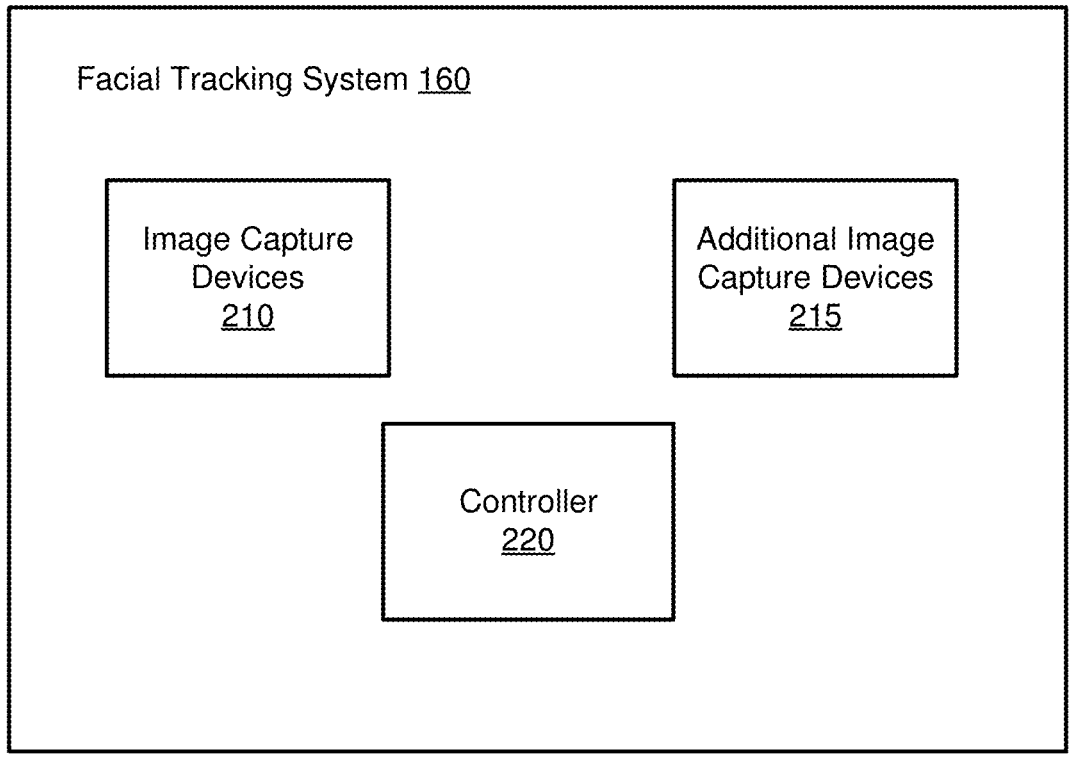
FIG. 2 is a block diagram of a facial tracking system of the virtual reality or the augmented reality system, in accordance with an embodiment.

FIG. 2 is a block diagram of one embodiment of a facial tracking system 160 of the system environment 100 for VR or AR. In the example shown in FIG. 2, the facial tracking system 160 includes one or more image capture devices 210, one or more additional image capture devices 215, and a controller 220. In other embodiments, different and/or additional components may be included in the facial tracking system 160.

Figure 4:
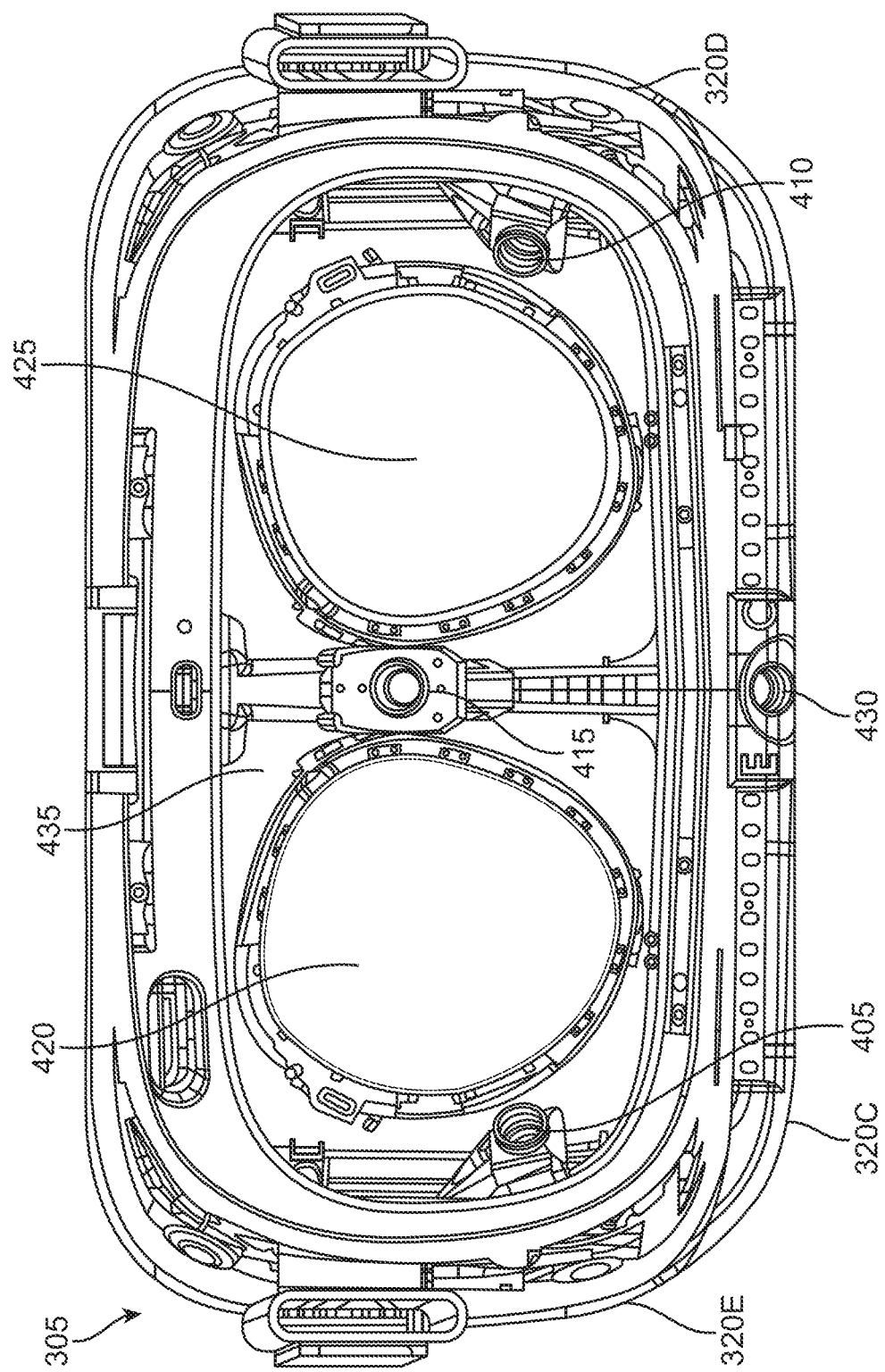
FIG. 4 is a rear view of the front rigid body of the HMD 300 shown in FIG. 3, in accordance with an embodiment.

The image capture devices 210 capture images of portions of a face of a user of the HMD 105, while the additional image capture devices 215 capture additional images of other portions of the face of the user of the HMD 105. In various embodiments, the image capture devices 210 are positioned so each image capture device 210 has a different field of view and a different depth, so different image capture devices 210 capture images of different portions of the user's face. Different image capture devices 210 have known positions relative to each other and are positioned to have complementary fields of view including different portions of the user's face. Similarly, the additional image capture devices 215 are positioned so each additional image capture device 215 has a different field of view and a different depth, so different additional image capture devices 215 capture different images of different portions of the user's face. Additionally, different additional image capture devices 215 have known positions relative to each other and are positioned to have fields of view including different portions of the user's face. The image capture devices 210 and the additional image capture devices 215 are positioned relative to each other to capture different portions of the user's face. For example, the image capture devices 210 are positioned to capture portions of the user's face that are outside of the HMD 105, such as lower portions of the user's face below a bottom surface of the HMD 105, while the additional image capture devices 210 are positioned to capture additional portions of the user's face that are enclosed by the HMD 105. FIG. 4 shows an example positioning of the image capture devices 210 and the additional image capture devices 215.

Image capture devices 210 and additional image capture devices 215 may capture images based on light having different wavelengths reflected by the portions of the user's face. For example, image capture devices 210 and additional image capture devices 215 capture infrared light reflected by portions of the user's face. In another example image capture devices 210 and additional image capture devices 215 capture visible light reflected by portions of the user's face. Image capture devices 210 and additional image capture devices 215 have various parameters such as focal length, focus, frame rate, ISO, sensor temperature, shutter speed, aperture, resolution, etc. In some embodiments, the image capture devices 210 and the additional image capture devices 215 have a high frame rate and high resolution. The image capture devices 210 and the additional image capture devices 215 can capture two-dimensional images or three-dimensional images in various embodiments.

In some embodiments, one or more illumination sources are coupled to one or more surfaces of the HMD 105 and are positioned to illuminate portions of the user's face. Illumination sources may be positioned at discrete locations along the HMD 105. In some embodiments, the one or more illumination sources are coupled to one or more exterior surfaces of the HMD 105. Additionally, one or more illumination sources may be positioned within a rigid body of the HMD 105 to illuminate portions of the user's face enclosed by the rigid body of the HMD 105. Example illumination sources include be light-emitting diodes (LEDs) that emit light in the visible band (i.e., ~380 nm to 750 nm), in the infrared (IR) band (i.e., ~750 nm to 1 mm), in the ultraviolet band (i.e., 10 nm to 380 nm), in some other portion of the electromagnetic spectrum, or in some combination thereof. In some embodiments, different illumination sources have different characteristics. As an example, different illumination sources emit light having different wavelengths or different temporal coherences describing correlation between light waves at different points in time. Further, light emitted by different illumination sources may be modulated at different frequencies or amplitudes (i.e., varying intensity) or multiplexed in a time domain or in a frequency domain.

The controller 220 is coupled to the image capture devices 210 and to the additional image capture devices 215 and communicates instructions to the image capture devices 210 and to the additional image capture devices 215. Instructions from the controller 220 to an image capture device 210 or to an additional image capture device 215 cause the image capture device 210 or the additional image capture device 215 to capture one or more images of portions of the user's face within the field of view of the image capture device 210 or of the additional image capture device 215. In an embodiment, the controller 220 stores captured data describing characteristics of portions of the user's face (e.g., images of portions of the user's face) in a storage device accessible by the controller 220. The controller 220 includes a trained model that maps positions of points identified within images captured by various image capture devices 210 or additional image capture devices 215 to a set of animation parameters that map points of the user's face included in images captured by the image capture devices 210 or by the additional image capture devices 215 to a three dimensional (3D) model of a face that is presented in a virtual reality environment or in an augmented reality environment to present a graphical representation of the user's face replicating the user's facial expression or facial movement captured by the image capture devices 210 or by the additional image capture devices 215. Additionally, the controller 220 includes another trained model that, when applied to images including portions of the user's face including the user's left eye and other images including portions of the user's face including the user's right eye, determine fixation of the user's left eye and of the user's right eye relative to a position of the user's head, as further described below in conjunction with FIG. 6.

In some embodiments, the controller 220 communicates the set of animation parameters to the console 110, which may store the facial animation model in association with information identifying the user. The console 110 may communicate the set of animation parameters and information associated with the user to one or more other consoles 110, allowing HMDs 105 coupled to the other consoles 110 to present graphical representations of the user's face reflecting facial expressions or facial movements of the user captured by the image capture devices 210 and by the additional image capture devices 215. In some embodiments, the console 110 may communicate the set of animation parameters to a server that stores animation parameters in association with information identifying different users. Additionally, the console 110 may modify content provided to the HMD 105 for presentation based on the set of animation parameters and other information received from the controller 220, such as positions of points identified within images captured from one or more image capture devices 210 or additional image capture devices 215 and provided to the controller 220. For example, the console 110 generates a graphical representation of the user's face that renders movement of the portions of the user's face on a three-dimensional model based on the set of animation parameters and positions of points identified within captured images of portions of the user's face; this allows the graphical representation of the user's face to replicate expressions and movement of portions of the user's face captured by one or more of the image capture devices 210 or by one or more of the additional image capture devices 210.

Head Mounted Display

Figure 3:
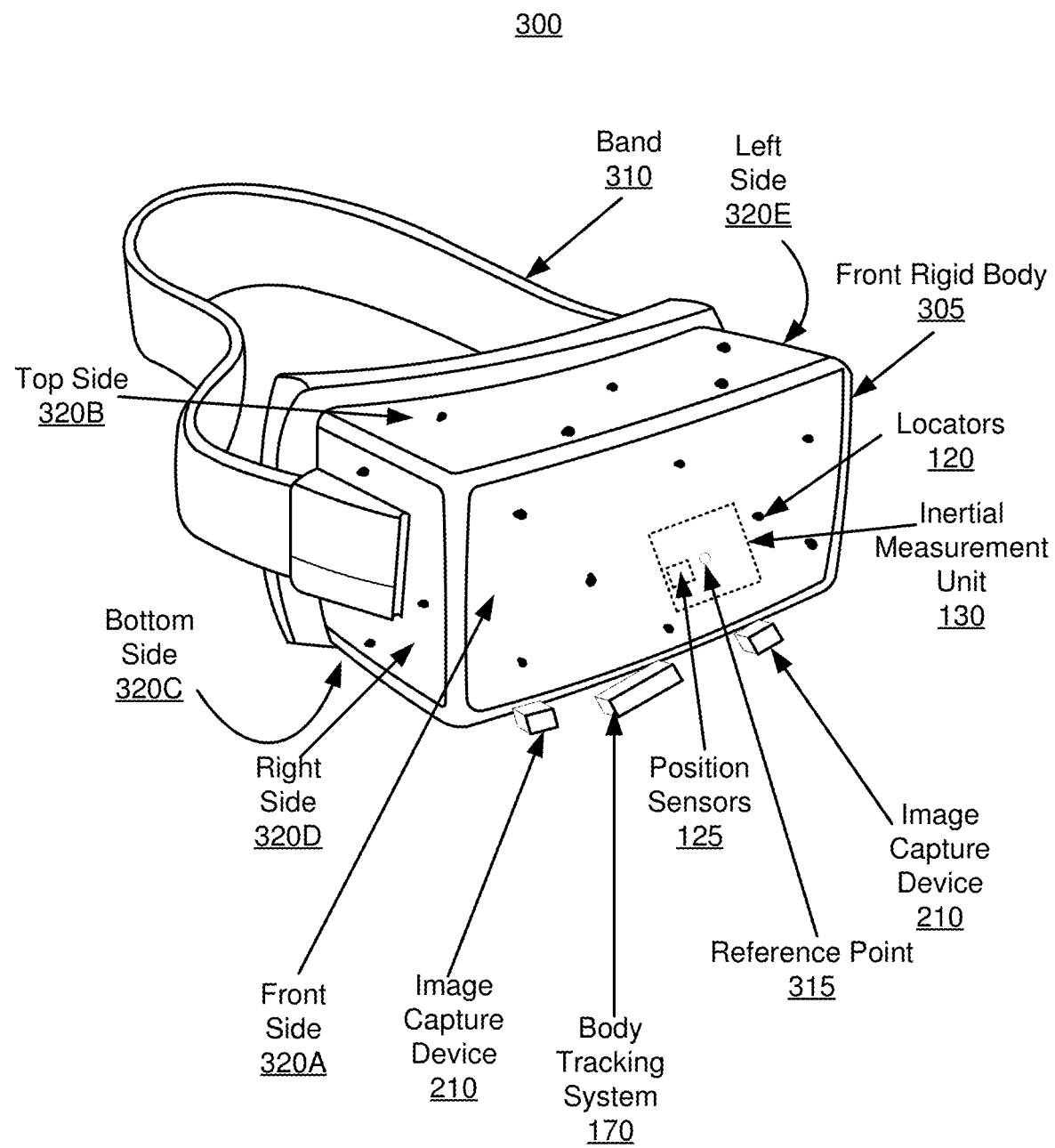
FIG. 3 is a wire diagram of a head mounted display, in accordance with an embodiment.

FIG. 3 is a wire diagram of one embodiment of a HMD 300. The HMD 300 shown in FIG. 3 is an embodiment of the HMD 105 that includes a front rigid body 305 and a band 310. The front rigid body 305 includes the electronic display 115 (not shown in FIG. 3), the IMU 130, the one or more position sensors 125, and the locators 120. In the embodiment shown by FIG. 3, the position sensors 125 are located within the IMU 130, and neither the IMU 130 nor the position sensors 125 are visible to the user.

The locators 120 are located in fixed positions on the front rigid body 305 relative to one another and relative to a reference point 315. In the example of FIG. 3, the reference point 315 is located at the center of the IMU 130. Each of the locators 120 emit light that is detectable by the imaging device 135. Locators 120, or portions of locators 120, are located on a front side 320A, a top side 320B, a bottom side 320C, a right side 320D, and a left side 320E of the front rigid body 305 in the example shown in FIG. 3.

In the example of FIG. 3, the HMD 300 includes image capture devices 210 coupled to the bottom side 320A of the HMD 300. For example, an image capture device 210 is coupled to the bottom side 320C of the HMD 300 proximate to the right side 320D of the HMD 300, and another image capture device 210 is coupled to the bottom side 320C of the HMD 300 proximate to the left side 320E of the HMD 300. The image capture devices 210 capture images of portions of the user's face below the bottom side 320C of the HMD 300. In the example of FIG. 3, the image capture device 210 captures images of portions of the user's face proximate to the right side 320D of the HMD 300, while the other image capture device 210 captures images of portions of the user's face proximate to the left side 320E of the HMD 300. While FIG. 3 shows an embodiment with two image capture devices 210, any number of image capture devices 210 may be included in various embodiments. The image capture devices 210 have specific positions relative to each other. Additionally, in various embodiments, different image capture devices 210 have non-overlapping fields of view.

Similarly, a body tracking system 170 including multiple imaging devices is coupled to the bottom side 320C of the HMD 300 in FIG. 3. Each imaging device of the body tracking system 170 is configured to capture images of portions of the user's body below the HMD 300 and external to the HMD 300. In various embodiments, different imaging devices of the body tracking system 170 have non-overlapping fields of view.

FIG. 4 is a rear view of the front rigid body 305 of the HMD 300 shown in FIG. 3. In the embodiment shown in FIG. 4, the front rigid body 305 includes an eyecup assembly 435 including an exit pupil 420 and an additional exit pupil 425. The exit pupil 420 is a position where an eye of a user is positioned when the user is wearing the HMD 300, while the additional exit pupil is a position where another eye of the user is positioned when the user is wearing the HMD 300.

In the example of FIG. 4, a left image capture device 405 is coupled to an interior surface of the left side 320E of the front rigid body 305 of the HMD 300 and is proximate to a bottom side 320C of the front rigid body 305 of the HMD 300. The left image capture device 405 captures images of a portion of the user's face. In the example of FIG. 4, the left image capture device 405 captures images of a portion of the user's face proximate to the to the left side 320E of the front rigid body 305 of the HMD 300 and including an eye of the user positioned at the exit pupil 420 of the HMD 300. Additionally, a right image capture device 410 is coupled to an interior surface of the right side 320D of the front rigid body of the HMD 300 and is proximate to the bottom side 320C of the front rigid body 305 of the HMD 300. The right image capture device 410 captures images of a portion of the user's face. In the example of FIG. 4, the right image capture device 410 captures images of a portion of the user's face proximate to the to the right side 320D of the front rigid body 305 of the HMD 300 and including an eye of the user positioned at the additional exit pupil 425 of the HMD 300.

In various embodiments, a left illumination source is positioned proximate to the left image capture device 405 and a right illumination source is positioned proximate to the right image capture device 410. The left illumination source emits light illuminating the portion of the user's face captured by the left image capture device 405, while the right illumination source emits light illuminating the additional portion of the user's face captured by the right image capture device 410. For example, the left illumination source and the right illumination source each comprise one or more light emitting diodes (LEDs), although any suitable device emitting light may be used as the left illumination source or the right illumination source. The left illumination source may be a ring of one or more LEDs arranged around a circumference of a lens of the left image capture device 405, or the right illumination source may be a ring of one or more LEDs arranged around a circumference of a lens of the right illumination source 410 in various embodiments. In various embodiments, the left illumination source and the right illumination source each emit infrared light to illumination the portion of the user's face and the additional portion of the user's face, respectively. However, in other embodiments, the left illumination source and the right illumination source emit any suitable wavelength or wavelengths of light to illuminate the portion and the additional portion of the user's face.

Additionally, the left illumination source is synchronized with the left image capture device 405, so the left illumination source illuminates the portion of the user's face when the left image capture device 405 is capturing an image, but does not illuminate the portion of the user's face when the left image capture device 405 is not capturing an image, in some embodiments. Similarly, the right illumination source is synchronized with the right image capture device 410, so the right illumination source illuminates the additional portion of the user's face when the right image capture device 410 is capturing an image, but does not illuminate the additional portion of the user's face when the right image capture device 410 is not capturing an image, in some embodiments. For example, the left image capture device 405 communicates a control signal to the left illumination source when the left image capture device 405 captures an image, causing the left illumination source to emit light while the left image capture device 405 captures the image; similarly, the right image capture device 410 communicates a control signal to the right illumination source when the right image capture device 410 captures an image, causing the right illumination source to emit light while the right image capture device 410 captures the image. Alternatively, the left illumination source, the right illumination source, or the left illumination source and the right illumination source illuminate the portion of the user's face or the additional portion of the user's face when the left image capture device 405 or the right image capture device 410 capture images and when the left image capture device 405 or the right image capture device 410 do not capture images.

The front rigid body 305 of the HMD 300 shown in FIG. 4 also includes a central image capture device 415 that is positioned within the front rigid body 305 between the exit pupil 420 and the additional exit pupil 425. The central image capture device 415 is configured to capture images of a central portion of the user's face that is enclosed by the front rigid body 305. In various embodiments, the central portion of the user's face includes a segment of the portion of the user's face as well as a segment of the additional portion of the user's face. In some embodiments, the central image capture device 415 is coupled to the eyecup assembly 435 or is embedded in the eyecup assembly 435. Alternatively, the central image capture device 415 is coupled to an interior surface of the front side 320A of the front rigid body 305. The left image capture device 405, the right image capture device 410, and the central image capture device 415 are examples of the additional image capture devices 215 of the facial tracking system 160.

A central illumination source is positioned proximate to the central image capture device 415 in various embodiments. For example, the central illumination source comprises one or more light emitting diodes positioned around a circumference of a lens of the central image capture device 415, although the central illumination source may have any suitable position in various embodiments. As described above, the central image capture device 415 provides a control signal to the central illumination source when the central image capture device 415 is capturing an image, causing the central illumination source to emit light while the central image capture device 415 is capturing an image, and provides an alternative control signal to the central illumination source when the central image capture device 415 stops capturing an image, causing the central illumination source to stop emitting light when the central image capture device 415 is not capturing an image. Alternatively, the central illumination source is configured to emit light both when the central image capture device 415 is capturing images and when the central image capture device 415 is not capturing images.

In the example of FIG. 4, an external image capture device 430 is coupled to the bottom side 320C of the front rigid body 305 of the HMD 300. The external image capture device 430 is configured to capture images of a portion of the user's face external to the front rigid body 305. For example, the external image capture device 430 is configured to capture images of a portion of the user's face external to the bottom side 320C of the front rigid body 305 (e.g., a mouth of the user). An external illumination source is positioned proximate to the external image capture device 430 in various embodiments. For example, the external illumination source comprises one or more light emitting diodes positioned around a circumference of a lens of the external image capture device 430, although the external illumination source may have any suitable position in various embodiments. As described above, the external image capture device 430 provides a control signal to the external illumination source when the external image capture device 430 is capturing an image, causing the external illumination source to emit light while the external image capture device 430 is capturing an image, and provides an alternative control signal to the external illumination source when the external image capture device 430 stops capturing an image, causing the external illumination source to stop emitting light when the external image capture device 430 is not capturing an image. Alternatively, the external illumination source is configured to emit light both when the external image capture device 430 is capturing images and when the external image capture device 430 is not capturing images. The external image capture device 430 is an example of an image capture device 210 of the facial tracking system 160.

Additionally, the controller 220 or the console 110 provides instructions to the left illumination source, the right illumination source, the central illumination source, and the external illumination source. Based on the instructions, the left illumination source, the right illumination source, the central illumination source, and the external illumination source modify emitted light.

In various embodiments, the left imaging device 405, the right imaging device 410, the central imaging device 415, and the external imaging device 430, each have a common field of view. For example, the left imaging device 405, the right imaging device 410, the central imaging device 415, and the external imaging device 430 each have a field of view of at least 105 degrees. In other embodiments, the left imaging device 405, the right imaging device 410, the central imaging device 415, and the external imaging device 430 have one or more different fields of view. For example, the left imaging device 405 and the right imaging device 410 have narrower fields of view than the central imaging device 415. As another example, the external imaging device 430 has a field of view that is wider than fields of view of the left image capture device 405, the right image capture device, and the central image capture device 415.

Figure 5:
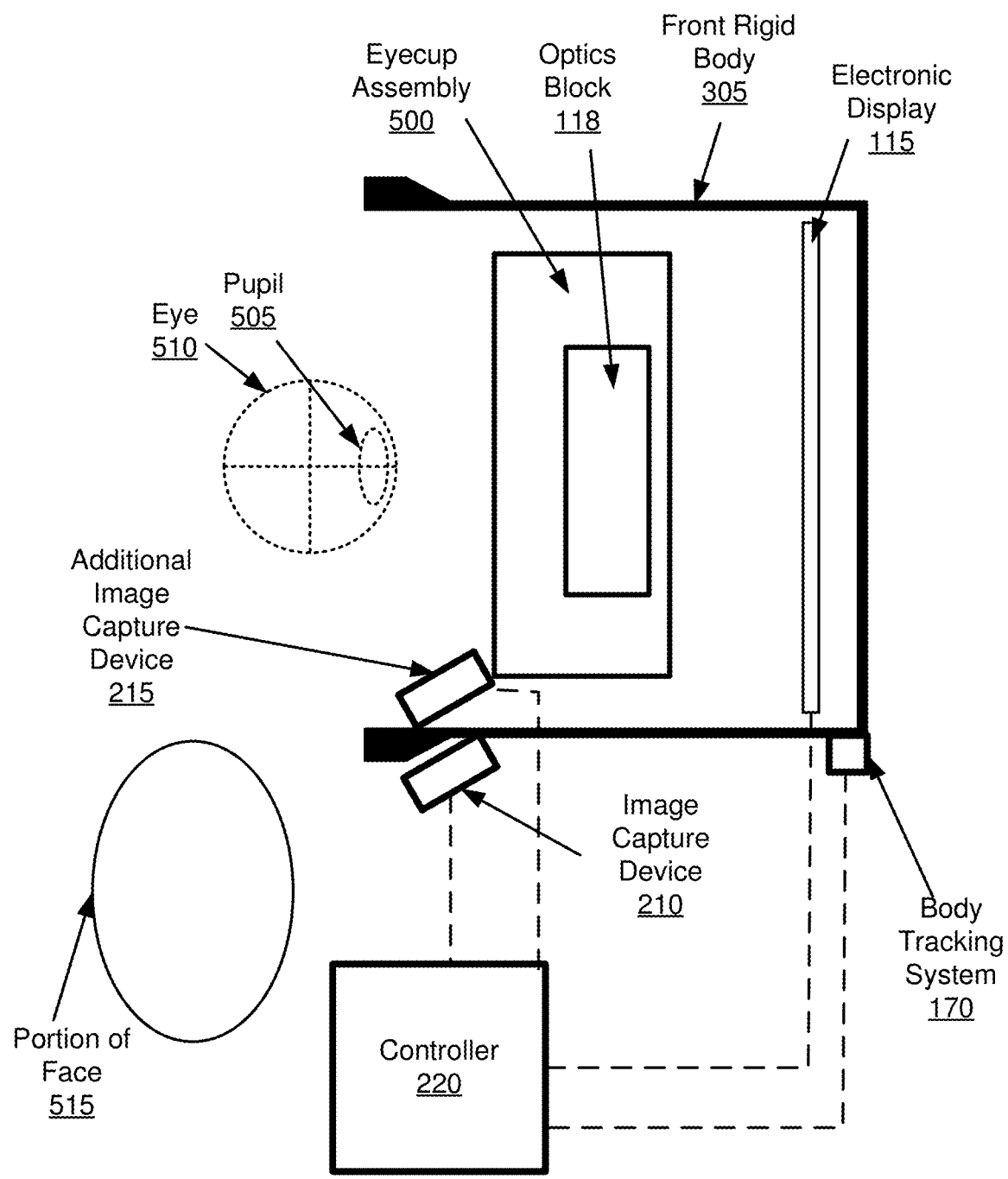
FIG. 5 is a cross section of the front rigid body of the head mounted display in FIG. 3, in accordance with an embodiment.

FIG. 5 is a cross-sectional diagram of an embodiment of the front rigid body 305 of the HMD 300 shown in FIG. 3. In the embodiment shown in FIG. 5, the front rigid body 305 includes an eyecup assembly 500, an image capture device 210, an additional image capture device 215, a controller 220, the body tracking system 170 an optics block 118, and an electronic display 115. The image capture device 210 is coupled to a bottom side of the front rigid body 305 in the example shown by FIG. 5 and positioned to capture images of a portion 415 of the user's face. For purposes of illustration, FIG. 5 shows a single image capture device 210; however, in various embodiments, any suitable number of image capture devices 210 may be coupled to the front rigid body 305 and positioned to capture images of the portion 515 of the user's face, as shown in the example of FIG. 4. For example, the image capture device 210 is proximate to a right side of the front rigid body 305, while another image capture device 210 is proximate to a left side of the front rigid body 305, as shown in the example of FIG. 4. While FIG. 5 shows the image capture device 210 coupled to an exterior surface of the front rigid body 305, in some embodiments the image capture device 210 is coupled to an interior surface of the front rigid body 305, which is transparent to or does not substantially attenuate wavelengths of light captured by the image capture device 210.

Additionally, in the example of FIG. 5, the HMD 300 includes an additional image capture device 215 within the front rigid body 305 and positioned to capture images of a portion of the user's face enclosed by the front rigid body 305. For purposes of illustration, FIG. 5 shows a single additional image capture device 215; however, in various embodiments, any suitable number of additional image capture devices 215 may be coupled to or included in an interior surface of the front rigid body 305 and positioned to capture images of one or more portions of the user's face enclosed by the front rigid body 305. For example, the additional image capture device 215 is proximate to a right side of an interior of the front rigid body 305, while another additional image capture device 215 is proximate to a left side of the interior of the front rigid body 305. While FIG. 5 shows the additional image capture device 215 coupled to an interior surface of the front rigid body 305, in some embodiments the additional image capture device 215 is included in the front rigid body 305, which is transparent to or does not substantially attenuate wavelengths of light captured by the additional image capture device 215. Example positioning of one or more additional image capture devices is further described above in conjunction with FIG. 4.

The body tracking system 170 includes multiple imaging devices configured to capture images of portions of the user's body. In the example shown by FIG. 5, the body tracking system 170 is positioned on a bottom side of the HMD 300, and imaging devices comprising the body tracking system 170 are positioned to capture images of portions of the user's body below the HMD 300. While FIG. 5 shows the body tracking system 170 coupled to an exterior surface of the front rigid body 305 of the HMD 300, in some embodiments the body tracking system 170 is included in the front rigid body 305, which is transparent to or does not substantially attenuate wavelengths of light captured by the imaging devices of the body tracking system 170. The body tracking system 170 is coupled to the controller 220, which generates graphical representations of portions of the user's body included in images captured by the body tracking system 170.

The front rigid body 305 includes an optical block 118 that magnifies image light from the electronic display 115, and in some embodiments, also corrects for one or more additional optical errors (e.g., distortion, astigmatism, etc.) in the image light from the electronic display 115. The optics block 118 directs the image light from the electronic display 115 to a pupil 505 of the user's eye 510 by directing the altered image light to an exit pupil of the front rigid body 305 that is a location where the user's eye 510 is positioned when the user wears the HMD 300. For purposes of illustration, FIG. 5 shows a cross section of the right side of the front rigid body 305 (from the perspective of the user) associated with a single eye 510, but another optical block, separate from the optical block 118, provides altered image light to another eye (i.e., a left eye) of the user.

The controller 220 is communicatively coupled to the electronic display 115, allowing the controller 220 to provide content for to the electronic display 115 for presentation to the user (e.g., a graphical representation of one or more portions 515 of the user's face based on data captured by the image capture device 210 or by the additional image capture device 215, a graphical representation of one or more portions of the user's body included in images captured by the body tracking system 170). Additionally or alternatively, the controller 220 is communicatively coupled to the console 110 and communicates a set of animation parameters for generating graphical representations of one or more portions 515 of the user's face or body to the console 110, which includes one or more graphical representations of portions 415 of the user's face or body in content provided to the electronic display 115, or generates content for presentation by the electronic display 115 based on the set of animation parameters received from the controller 220. Additionally, the controller 220 is communicatively coupled to the image capture device 210 and to the additional image capture device 215, allowing the controller 220 to provide instructions to the image capture device 210 and to the additional image capture device 215 for capturing images of the portion 415 of the user's face or for capturing images of an additional portion of the user's face, respectively. Similarly, the controller 220 is communicatively coupled to the body tracking system 170, allowing the controller 220 to provide instructions to the body tracking system 170 for capturing images of portions of the user's body.

Figure 6:
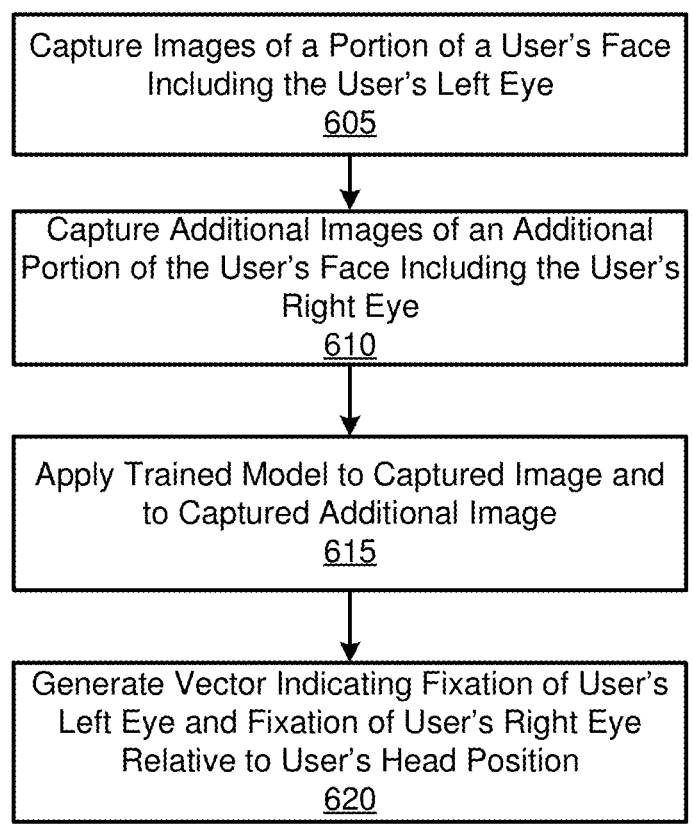
FIG. 6 is a flowchart of a method for determining fixation of a user's left eye and right eye from images of the user's face enclosed by a head mounted display (HMD) 105, in accordance with an embodiment.

Determining Fixation of a User's Eyes from Images of the User's Face Enclosed by a HMD FIG. 6 is a flowchart of one embodiment of a method for determining fixation of a user's left eye and right eye from images of the user's face enclosed by a head mounted display (HMD) 105. The method described in conjunction with FIG. 6 may be performed by the facial tracking system 160, the console 110, or another system in various embodiments. Other entities perform some or all of the steps of the method in other embodiments. Embodiments of the process may include different or additional steps than those described in conjunction with FIG. 6. Additionally, in some embodiments, steps of the method may be performed in different orders than the order described in conjunction with FIG. 6.

As described above in conjunction with FIG. 4, the HMD 105 includes a left image capture device 405 positioned within the HMD 105 (e.g., within a front rigid body of the HMD 105) and proximate to a left side of the HMD 105. The left image capture device 405 captures 605 images of a portion of the user's face enclosed by the HMD 105 that includes the user's left eye, as well as other features of the portion of the user's face. Similarly, the HMD 105 includes a right image capture device 410 positioned within the HMD 105 (e.g., within the front rigid body of the HMD 105) and proximate to a right side of the HMD 105. The right image capture device 410 captures 610 additional images of an additional portion of the user's face enclosed by the HMD 105 that includes the user's right eye, as well as other features of the additional portion of the user's face.

The left image capture device 405 and the right image capture device 410 are each coupled to a controller, further described above in conjunction with FIG. 2. The controller 220 receives the images including the user's left eye from the left image capture device 405 and receives the additional images including the user's right eye from the right image capture device 410. In various embodiments, timestamps or other information identifying times when images were captured 405 and when additional images were captured 410 are received by the controller 220 in conjunction with the images and the additional images. From the images including the user's left eye and the additional images including the user's right eye, the controller 220 determines a fixation of the user's left eye relative to a position of the user's head and a fixation of the user's right eye relative to the position of the user's head. Hence, the controller 220 determines where a gaze of the user's left eye and a gaze of the user's right eye are directed.

To determine the fixation of the user's left eye and the fixation of the user's right eye, the controller 220 applies 615 a trained model to an image and an additional image. Application of the model to the images and to the additional images generates 620 a vector indicating the fixation of the user's left eye and the fixation of the user's right eye relative to the position of the head of the user. In various embodiments, the controller 220 applies 615 the model to an image and to an additional image that are both associated with a common timestamp. The model is trained based on previously captured images of portions of one or more other users' faces including the other users' left eyes and previously captured images of additional portions of the one or more other users' faces including the other users' right eyes. one In various embodiments, the trained model is a trained convolutional neural network that generates 620 the vector identifying fixation of the user's left eye and fixation of the user's right eye relative to the position of the head of the user. Unlike conventional gaze tracking systems, the images include the user's left eye and other features of the portion of the user's face and the additional images include the user's right eye and other features of the additional portion of the user's face. This allows the controller 220 to determine fixation of the user's right eye and fixation of the user's left eye from images in which fewer pixels are used to represent the user's left eye and the user's right eye than conventional gaze tracking systems.

In various embodiments, information used to train the trained model is obtained by the controller 220 from a console 130 or another device that obtained information from other HMDs 105 worn by the other users during a calibration process. For example, a calibration process is performed when a HMD 105 is worn by different users. During the calibration process, the HMD 105 presents a calibration image to the user wearing the HMD 105. The calibration image is presented at a fixed point on an electronic display 115 of the HMD 105. For example, the presented calibration image comprises illumination of a specific set of pixels at a specific location of the electronic display 115 of the HMD 105. While the calibration image is presented by the electronic display 115 of the HMD 105, the HMD 105 presents instructions directing the user to fix a gaze of the user's left eye and to fix a gaze of the user's right eye to the calibration image. While the gaze of the user's left eye and the gaze of the user's right eye are directed to the calibration image, the electronic display 115 of the HMD 105 prompts the user to reposition the user's head to specific positions at specific times. During a time interval after presenting a prompt to the user to reposition the user's head to a specific position while maintaining fixation of the gaze of the user's left eye and fixation of the user's right eye on the calibration image, the left image capture device 405 and the right image capture device 410 of the HMD 105 capture images and additional images of the user's face. The controller 220 receives the images and the additional images captured while the user's head has the specific position and associates information identifying the specific position of the user's head with the images and the additional images captured when the user's head has the specific position. Based on the images and additional images captured when the user's head has different specific positions, the controller 220, a console 130, or another device applies gradient descent applied to the images and additional images associated with different specific positions of the user's head to train the trained model to generate a vector representing fixation of the user's gaze relative to the position of the user's head. In various embodiments, the trained model is determined from images and additional images of multiple users wearing different HMDs 105 and refined for the user wearing the HMD 105 by performing the calibration process when the user wears the HMD 105. The trained model may account for additional information, such as an interpupilary distance between centers of pupils of the user's left eye and the user's right eye determined by the controller 220 using any suitable method. As another example, the trained model accounts for light emitted by a left illumination source and by a right illumination source, further described above in conjunction with FIG. 4, and reflected by the user's left eye and by the user's right eye, respectively. Additionally, the controller 220 modifies the trained model over time based on images and additional images captured the left image capture device 405 and by the right image capture device 410, respectively, in some embodiments.

In some embodiments, the controller 220 modifies content presented by the electronic display 115 of the HMD 105 based on the generated vector. For example, the controller 220 increases a resolution of a segment of content at a location of the electronic display 115 of the HMD 105 corresponding to the fixation of the user's left eye relative to a resolution of content presented at other locations of the electronic display 115, and increases a resolution of a segment of content at an additional location of the electronic display 115 of the HMD 105 corresponding to the fixation of the user's right eye relative to a resolution of content presented at other locations of the electronic display 115. Alternatively, the controller 220 transmits the generated vector to a console 130 or another device that generates content for presentation to the user via the electronic display 115 of the HMD 105. Subsequently, the console 130 or other device generates content for presentation that accounts for the fixation of the user's left eye and the fixation of the user's right eye.

In various embodiments, a left illumination source is positioned proximate to the left image capture device, and a right illumination source is positioned proximate to the right image capture device. For example, the left illumination source comprises one or more light emitting diodes (LEDs) positioned around a circumference of a lens of the left image capture device, while the right illumination source comprises one or more LEDs positioned around a circumference of a lends of the right image capture device. The left illumination source and the right illumination source emit light that illuminates the portion of the user's face within a field of view of the left image capture device 405 and that illuminates the additional portion of the user's face within a field of view of the right image capture device 410. In various embodiments, the left illumination source and the right illumination source both emit light having infrared wavelengths; however, the left illumination source and the right illumination source may emit light having any suitable wavelength or wavelengths in various embodiments. Light emitted by the left illumination source and by the right illumination source allows the left image capture device 405 and the right image capture device 410, respectively, to capture further details of the portion of the user's face and of the additional portion of the user's face.

The left illumination source and the right illumination source are coupled to the controller 220, which provides instructions to the left illumination source or to the right illumination source that modifies light emitted by one or more portions of the left illumination source or emitted by one or more portions of the right illumination source. In various embodiments, the controller 220 modifies light emission by the left illumination source based on one or more images received from the left image capture device 405 and modifies light emission by the right illumination source based on one or more images received from the right image capture device 405. In various embodiments, the controller 220 receives one or more calibration images from the left image capture device 405 and modifies light emitted by one or more portions of the left illumination source to minimize a function based on saturation or exposure of the one or more calibration images. Similarly, the controller 220 receives one or more additional calibration images from the right image capture device 410 and modifies light emitted by one or more portions of the right illumination source to minimize the function based on saturation or exposure of the one or more additional calibration images. The controller 220 modifies light emitted by different portions of the left image capture device 405 and emitted by different portions of the right image capture device 410 so light incident on the portion of the user's face and on the additional portion of the user's face optimizes the images and the additional images captured by the left image capture device 405 and captured by the right image capture device 410, respectively. For example, the controller 220 differently modifies light emitted by different LEDs comprising the left image capture device 405 to minimize the function based on saturation or exposure of the one or more calibration images. Similarly, the controller 220 differently modifies light emitted by different LEDs comprising the right image capture device 410 to minimize the function based on saturation or exposure of the one or more additional calibration images. Hence, modification of light emitted by the left image capture device 405 and by the right image capture device 410 allows the controller to modify light incident on different regions of the portion of the user's face and on different regions of the additional portion of the user's face.

The controller 220 may receive the calibration images and the additional calibration images during particular time intervals, or may select any suitable images received from the left image capture device 405 and from the right image capture device 410 as the calibration images or the as the additional calibration images, respectively. As another example, the controller 220 receives an indication that the HMD 105 is initially worn by the user and modifies light emitted by the left illumination source or by the right illumination source based on images received from the left image capture device 405 and from the right illumination source 410 within a threshold time after receiving the indication. For example, the indication is provided to the controller 220 from a position sensor 125 in the HMD 105 has a specific change in orientation relative to a reference orientation. As another example, the indication is provided to the controller 220 from the electronic display 115 in response to the electronic display receiving power.

In some embodiments, the controller 220 obtains information from a console 130 or another source describing light emitted by left illumination sources 405 and right illumination sources 410 included in other HMDs 105. For example, the controller 220 obtains information from the console 130 describing light emission by left illumination sources 405 and right illumination sources 410 included in other HMDs 105 determined from training processes performed by the other HMDs 105. The controller 220 subsequently modifies the obtained information based on calibration images and additional calibration images captured by the left image capture device 405 and by the right image capture device 405, as further described above. This modification of the left illumination source and the right illumination source based on images captured by the left image capture device 405 and additional images captured by the right image capture device 410, respectively, allows the controller 220 to prevent oversaturation or undersaturation of the images and the additional images by tailoring light emission by portions of the left illumination source or by portions of the right illumination source to the user wearing the HMD 105, which improves an accuracy with which the controller 220 determines fixation of the user's left eye and the user's right eye.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A device comprising:
   a left camera enclosed by a rigid body and configured to capture images of a portion of a user's face enclosed by the rigid body including the user's left eye;
   a left illumination source enclosed by the rigid body and configured to emit light illuminating the portion of the user's face, the left illumination source comprising a plurality of light emitting diodes (LEDs) positioned around a circumference of a lens of the left camera;
   a right camera enclosed by the rigid body and configured to capture additional images of an additional portion of the user's face enclosed by the rigid body including the user's right eye;
   a right illumination source enclosed by the rigid body and configured to emit light illuminating the additional portion of the user's face; and
   a controller configured to:
      modify light emitted by the left illumination source based on one or more of the images; and
      modify light emitted by the right illumination source based on one or more of the additional images.

2. The device of claim 1, wherein the controller is further configured to:
   generate a vector indicating a fixation of the user's left eye and a fixation of the user's right eye relative to the position of the head of the user by applying a model to the images and to the additional images.

3. The device of claim 2, wherein the model comprises a trained convolutional neural network.

4. The device of claim 1, wherein the left illumination source comprises a plurality of light emitting diodes (LEDs), and modify light emitted by the left illumination source based on one or more of the images comprises:
   modify light emitted by at least a set of LEDs comprising the left illumination source to minimize a function based on saturation with light of the one or more images captured by the left camera so the function has a minimum value.

5. The device of claim 4, wherein the right illumination source comprises a plurality of light emitting diodes (LEDs), and modify light emitted by the right illumination source based on one or more of the additional images comprises:
   modifying light emitted by at least a set of LEDs comprising the right illumination source to minimize a function based on saturation with light of the one or more additional images captured by the right camera so the function has the minimum value.

6. The device of claim 1, wherein modify light emitted by the left illumination source based on one or more images captured by the left illumination source comprises:
   modify light emitted by one or more portions of the left illumination source based on one or more images captured by the left camera in response to receiving an indication the device is initially worn by the user.

7. The device of claim 6, wherein modify light emitted by the right illumination source based on one or more images captured by the right illumination source comprises:
   modify light emitted by one or more portions of the right illumination source based on one or more images captured by the right camera in response to receiving the indication the device is initially worn by the user.

8. The device of claim 1, wherein the right illumination source comprises an additional plurality of light emitting diodes (LEDs) positioned around a circumference of a lens of the right camera.

9. A method comprising:
   capturing calibration images of a portion of a user's face enclosed by a head mounted display (HMD) via a left image capture device included in the HMD, the portion of the user's face including a left eye of the user;
   modifying light emitted by one or more portions of a left illumination source onto the portion of the user's face enclosed by the HMD based on the calibration images, the left illumination source comprising a plurality of light emitting diodes (LEDs) positioned around a circumference of a lens of the left image capture device;
   capturing additional calibration images of a portion of a user's face enclosed by a head mounted display (HMD) via a right image capture device included in the HMD, the additional portion of the user's face including a right eye of the user;
   modifying light emitted by one or more portions of a right illumination source onto the additional portion of the user's face enclosed by the HMD based on the additional calibration images by modifying light emitted by a LED positioned around the circumference of the lens of the left image capture device to minimize a function based on saturation with light of the one or more calibration images so the function has a minimum value;
   capturing images of the portion of a user's face enclosed by a head mounted display (HMD) via the left image capture device included in the HMD, the portion of the user's face including the left eye of the user;
   capturing additional images of the additional portion of the user's face enclosed by the head mounted display via the right image capture device included in the HMD, the additional portion of the user's face including the right eye of the user;
   applying a model to the images and to the additional images, the model trained based on previously captured images including portions of users' faces including left eyes and previously captured images including portions of users' faces including right eyes; and
   generating a vector indicating a fixation of the user's left eye and a fixation of the user's right eye relative to a position of the head of the user from application of the model to the images and to the additional images.

10. The method of claim 9, wherein the right illumination source comprises a plurality of additional light emitting diodes (LEDs) positioned around a circumference of a lens of the right image capture device and modifying light emitted by one or more portions of the right illumination source onto the additional portion of the user's face enclosed by the HMD based on one or more additional calibration images captured by the right image capture device comprises:
   modifying light emitted by an additional LED positioned around the circumference of the lens of the right image capture device to minimize the function based on saturation with light of the one or more additional calibration images so the function has the minimum value.

11. The method of claim 9, wherein the model comprises a trained convolutional neural network.

12. The method of claim 9, wherein capturing images of the portion of a user's face enclosed by the HMD via the left image capture device included in the HMD comprises:
  capturing the images of the portion of the user's face enclosed by the HMD via the left image capture device included in the HMD after after modifying the light emitted by the one or more portions of the left illumination source.

13. The method of claim 12, wherein capturing the additional images of the additional portion of the user's face enclosed by the head mounted display via the right image capture device included in the HMD comprises:
  capturing the additional images of the portion of the user's face enclosed by the HMD via the right image capture device included in the HMD after modifying the light emitted by the one or more portions of the right illumination source.

14. A computer program product comprising a non-transitory computer readable storage medium having instructions encoded thereon that, when executed by a processor, cause the processor to:
  capture calibration images of a portion of a user's face enclosed by a head mounted display (HMD) via a left image capture device included in the HMD, the portion of the user's face including a left eye of the user;
  modify light emitted by one or more portions of a left illumination source onto the portion of the user's face enclosed by the HMD based on the calibration images;
  capture additional calibration images of a portion of a user's face enclosed by a head mounted display (HMD) via a right image capture device included in the HMD, the additional portion of the user's face including a right eye of the user, the right illumination source comprising a plurality of additional light emitting diodes (LEDs) positioned around a circumference of a lens of the right image capture device;
  modify light emitted by one or more portions of a right illumination source onto the additional portion of the user's face enclosed by the HMD based on the additional calibration images by modifying light emitted by an additional LED positioned around the circumference of the lens of the right image capture device to minimize the function based on saturation with light of the one or more additional calibration images so the function has a minimum value;
  capture images of the portion of a user's face enclosed by a head mounted display (HMD) via the left image capture device included in the HMD, the portion of the user's face including the left eye of the user;
  capture additional images of the additional portion of the user's face enclosed by the head mounted display via the right image capture device included in the HMD, the additional portion of the user's face including the right eye of the user;
  apply a model to the images and to the additional images, the model trained based on previously captured images including portions of users' faces including left eyes and previously captured images including portions of users' faces including right eyes; and
  generate a vector indicating a fixation of the user's left eye and a fixation of the user's right eye relative to a position of the head of the user from application of the model to the images and to the additional images.

15. The computer program product of claim 14, wherein the left illumination source comprises a plurality of light emitting diodes (LEDs) positioned around a circumference of a lens of the left image capture device and modify light emitted by one or more portions of the left illumination source onto the portion of the user's face enclosed by the HMD based on one or more calibration images captured by the left image capture device comprises:
  modify light emitted by a LED positioned around the circumference of the lens of the left image capture device to minimize a function based on saturation with light of the one or more calibration images so the function has the minimum value.

16. The computer program product of claim 14, wherein capture images of the portion of a user's face enclosed by the HMD via the left image capture device included in the HMD comprises:
  capture the images of the portion of the user's face enclosed by the HMD via the left image capture device included in the HMD after modifying the light emitted by the one or more portions of the left illumination source.

17. The computer program product of claim 16, wherein capture the additional images of the additional portion of the user's face enclosed by the head mounted display via the right image capture device included in the HMD comprises:
  capture the additional images of the portion of the user's face enclosed by the HMD via the right image capture device included in the HMD after modifying the light emitted by the one or more portions of the right illumination source.

* * * * *

UNITED STATES PATENT AND TRADEMARK OFFICE
CERTIFICATE OF CORRECTION

PATENT NO. : 10,795,436 B2
APPLICATION NO. : 16/683014
DATED : October 6, 2020
INVENTOR(S) : Shih-En Wei et al.

It is certified that error appears in the above-identified patent and that said Letters Patent is hereby corrected as shown below:

In the Claims

Column 23, Line 12, Claim 12, delete "after after" and insert -- after --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*